US006426571B1

(12) United States Patent
Doron

(10) Patent No.: US 6,426,571 B1
(45) Date of Patent: Jul. 30, 2002

(54) FIRMWARE CONTROLLED DRAIN-FREE CIRCUIT TO ALLOW BACKUP BATTERY INSTALLATION AT TIME OF MANUFACTURE

(75) Inventor: Amir Doron, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/557,642

(22) Filed: Apr. 25, 2000

(51) Int. Cl.$^7$ ............................... H02J 7/00; G06F 1/32
(52) U.S. Cl. .......................................... 307/66; 395/750
(58) Field of Search ............................. 307/66, 64, 65, 307/85, 86, 67; 395/750, 750.03, 750.06, 750.08; 364/492, 707, 578, 528

(56) References Cited

U.S. PATENT DOCUMENTS

| | | | |
|---|---|---|---|
| 4,701,858 A | * 10/1987 | Stokes et al. ............... | 364/483 |
| 4,709,202 A | * 11/1987 | Koenck et al. .............. | 320/112 |
| 4,794,525 A | 12/1988 | Pickert et al. | |
| 5,408,668 A | * 4/1995 | Tornai .......................... | 395/750 |
| 5,457,476 A | * 10/1995 | Jenson ......................... | 345/146 |
| 5,627,413 A | 5/1997 | Mughir et al. | |
| 5,686,767 A | 11/1997 | Helfrich et al. | |
| 5,692,203 A | 11/1997 | Grodevant | |
| 5,748,971 A | 5/1998 | Choi et al. | |
| 5,784,629 A | 7/1998 | Anderson et al. | |
| 5,920,727 A | 7/1999 | Kikinis et al. | |
| 5,938,771 A | 8/1999 | Williams et al. | |
| 5,958,054 A | * 9/1999 | O'Connor et al. .......... | 713/300 |
| 5,958,057 A | 9/1999 | Gianni | |
| 5,986,352 A | 11/1999 | Newman et al. | |

* cited by examiner

Primary Examiner—Rajnikant B. Patel
(74) Attorney, Agent, or Firm—Dennis G. Stenstrom

(57) ABSTRACT

Described is an electronic device for performing certain operations and includes a continuous operating unit providing operations benefitting from a backup battery for providing backup power to the continuous operating unit. The battery is installed in the electronic device at the time of manufacture and is connected to the continuous operating unit through a switch which is in the open position at the time of manufacture of the electronic device. An input device allows a user to input signals to the electronic device. A central processing unit is connected to the continuous operating unit and receives the input signals from the input device. The central processing unit contains firmware for performing the operations of the electronic device and the central processing unit closes the switch when a predetermined parameter is received from the input device. A main power source is connected to the central processing unit and the continuous operating unit for providing operating power to the central processing unit and the continuous operating unit. Also described is a method of operating an electronic device including executing an initialization procedure when an on/off control of a electronic device is actuated to an on condition, obtaining input information via an input device, analyzing the input information in a central processing unit to determine if a predetermined parameter is being input for the first time and closing a circuit between a backup battery and a continuous operating unit via a signal from the central processing unit when the predetermined parameter is input for the first time.

27 Claims, 2 Drawing Sheets

FIRMWARE CONTROLLED DRAIN-FREE CIRCUIT TO ALLOW BACKUP BATTERY INSTALLATION AT TIME OF MANUFACTURE

FIELD OF THE INVENTION

The present invention relates to electronic devices, and more particularly, to battery backup for a electronic devices.

BACKGROUND OF THE INVENTION

One drawback of conventional electronic devices is their need to have a secondary source of power so that they can remember certain important information stored in memory, for example the date and time, appointments, phone numbers, etc., in the event of a loss of main power. If the main power source device is a battery this can occur when the main battery is removed for replacement or recharging. If the main source of power is AC or DC power this can occur when there is a power failure or the device is accidentally unplugged. If the main power source is cut off for a short period of time, e.g., the battery is removed for immediate replacement, then a capacitor can be used to provide temporary power until the new batteries are inserted. However, if the batteries are removed for recharging then a capacitor is not sufficient because the batteries may sit out of the electronic device overnight or longer. In this case the designer of the electronic device generally provides a backup battery.

Electronic devices designed with backup batteries generally ship with the backup battery not installed in the device. The user must install the backup battery in the electronic device after they purchase the electronic device. This means that the packaging must contain the battery, the instructions must contain extra steps to show the user what to do with the backup battery, and the user must go through the extra step to install the backup battery.

It would be preferable if the electronic device could come from the factory with the backup battery already installed for the user. However, this is not done today because it is unknown how long the electronic device will sit on the store shelves before it reaches the customer, so by the time the customer takes it home, the backup battery might be drained of power. Some products provide a plastic tab that breaks the connection between the battery and the connectors, but in this case the user must still open the battery compartment, pull out the tab, and then put the cover back on.

Accordingly, it would be advantageous to be able to install the backup battery at the time of manufacture, but have the electronic device not drain the backup battery power until the user begins to use the electronic device.

SUMMARY OF THE INVENTION

The present invention is an electronic device for performing certain operations and includes a continuous operating unit providing operations benefitting from a backup battery for providing backup power to the continuous operating unit. The battery is installed in the electronic device at the time of manufacture and is connected to the continuous operating unit through a switch which is in the open position at the time of manufacture of the electronic device. An input device allows a user to input signals to the electronic device. A central processing unit is connected to the continuous operating unit and receives the input signals from the input device. The central processing unit contains firmware for performing the operations of the electronic device and the central processing unit closes the switch when a predetermined parameter is received from the input device. A main power source is connected to the central processing unit and the continuous operating unit for providing operating power to the central processing unit and the continuous operating unit. The invention also includes a method of operating an electronic device including executing an initialization procedure when an on/off control of a electronic device is actuated to an on condition, obtaining input information via an input device, analyzing the input information in a central processing unit to determine if a predetermined parameter is being input for the first time and closing a circuit between a backup battery and a continuous operating unit via a signal from the central processing unit when the predetermined parameter is input for the first time.

DETAILED DESCRIPTION OF A PREFERRED EMBODIMENT

As discussed above, electronic devices designed with backup batteries generally do not ship with the backup batteries installed in the electronic device. This is done because it is unknown how long the electronic device will sit on the store shelves before it reaches the customer, so by the time the customer takes it home, the backup battery might be drained of power. It would be preferable if the electronic device could come from the factory with the backup battery already installed for the user.

Also, it is preferable that the a circuit will not start using the backup battery power merely because the electronic device is first powered on. What is required is a circuit that will allow the electronic device to be shipped with the backup battery having been installed on the manufacturing line, but which does not allow power to flow from the backup battery until the circuit is modified by some predetermined particular action by the user which will allow power to flow from the backup battery.

Figure 1:
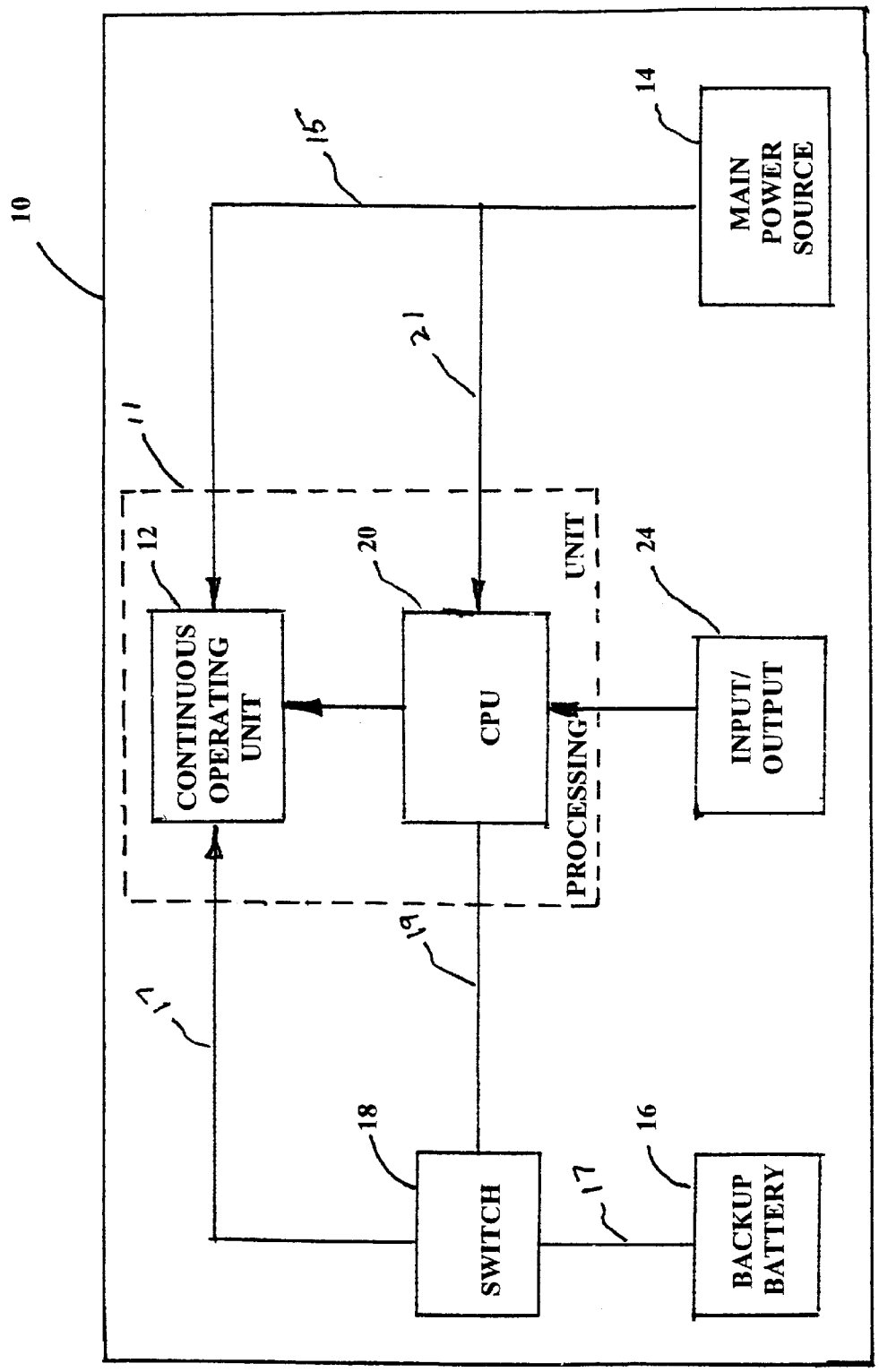
FIG. 1 is a block diagram of an electronic device incorporating the present invention.

Referring to FIG. 1, the continuous operating or real-time unit 12 of the processing unit 11 of electronic device 10 is responsible for keeping certain key operations running, e.g., a real-time clock or calendar, and is powered by two alternate power sources, the main power source 14 through line 15 and a backup battery 16 through line 17. The backup battery can be of any type of battery such as alkaline, mercury, lithium, nickel cadmium, metal hydride, or lithium ion. The main power source 14 may be AC or DC power or main batteries. The line 17 that connects the continuous operating unit 12 to the backup battery 16 goes through a switch or latch 18. If switch 18 is open, power cannot flow from the backup battery 16 to the continuous operating unit 12 and thus the battery 16 will not drain. This is how the electronic device 10 would leave the manufacturing line. The switch or latch 18 may be of any type that has the property of retaining its state of open or closed until receiving a signal to close. Moreover, the switch or latch 18 may be of the type that closes only one time and remains closed. A signal must be applied to switch 18 from central processing unit 20 to change its state from open to closed.

The central processing unit 20 of processing unit 11 is powered by the main power source 14 through line 21. The firmware of electronic device 10 runs on the central processing unit 20. The central processing unit 20 is in communication with continuous operating unit 12 via line 22 and switch 18 via line 19. The central processing unit 20 also communicates with input/output ports 24. The central processing unit may include, for example, an appointment scheduler, a phone directory, an address book and a calculator.

Allowing the electronic device 10 to be shipped with the backup battery 16 installed while not allowing power to flow from the backup battery 16 and drain the backup battery cannot be achieved with an electrical circuit alone if it is desired that the backup battery circuit not be activated by merely inserting batteries or someone simply turning on the electronic device 10. These type of acts may be inadvertent and may activate the backup battery 16 when it is not desired or intended that the backup battery be activated. Accordingly, it is preferable to avoid activating the backup battery 16 circuit by such acts, but rather only activate the backup battery circuit when a predetermined affirmative action by the end user occurs. However, it is more complicated to achieve this more preferable result.

To achieve this more preferable result, the present invention uses switch or latch 18 in conjunction with a "smart" firmware algorithm implemented on the central processing unit 20 of the electronic device 10. This "smart" algorithm decides when to change the state of the switch 18 based on input from the end user on input port 24. On the manufacturing line the switch 18 will be set to the "open" position so that the backup battery 16 power is cut off from the electronic device 10 controls. The central processing unit 20 changes the state of the switch 18 only when the predetermined parameter is entered by the user for the first time via input device 24. This change of the switch 18 completes the backup battery circuit so as to provide power from the backup battery 16 to the continuous operating unit 12 of electronic device 10. This predetermined parameter could be the time, date, a phone number or an appointment, etc. Thus, the central processing unit 20 only changes the state of the switch 18 when the predetermined parameter is first set by the user, so even if the electronic device is turned on and off in the store, the state of the switch 18 will not be changed by the central processing unit 20 until the user sets the particular predetermined parameter via input device 24.

After the setting of this predetermined parameter, power will flow from the backup battery 16 to the continuous operating unit 12 and the settings and programs of the continuous operating unit 12 will be maintained even when there is a power failure of the main power source 14. Such a power failure could occur when the main power source 14 comprises batteries and the batteries are removed from electronic device 10 for a significant period of time such as for recharging.

Figure 2:
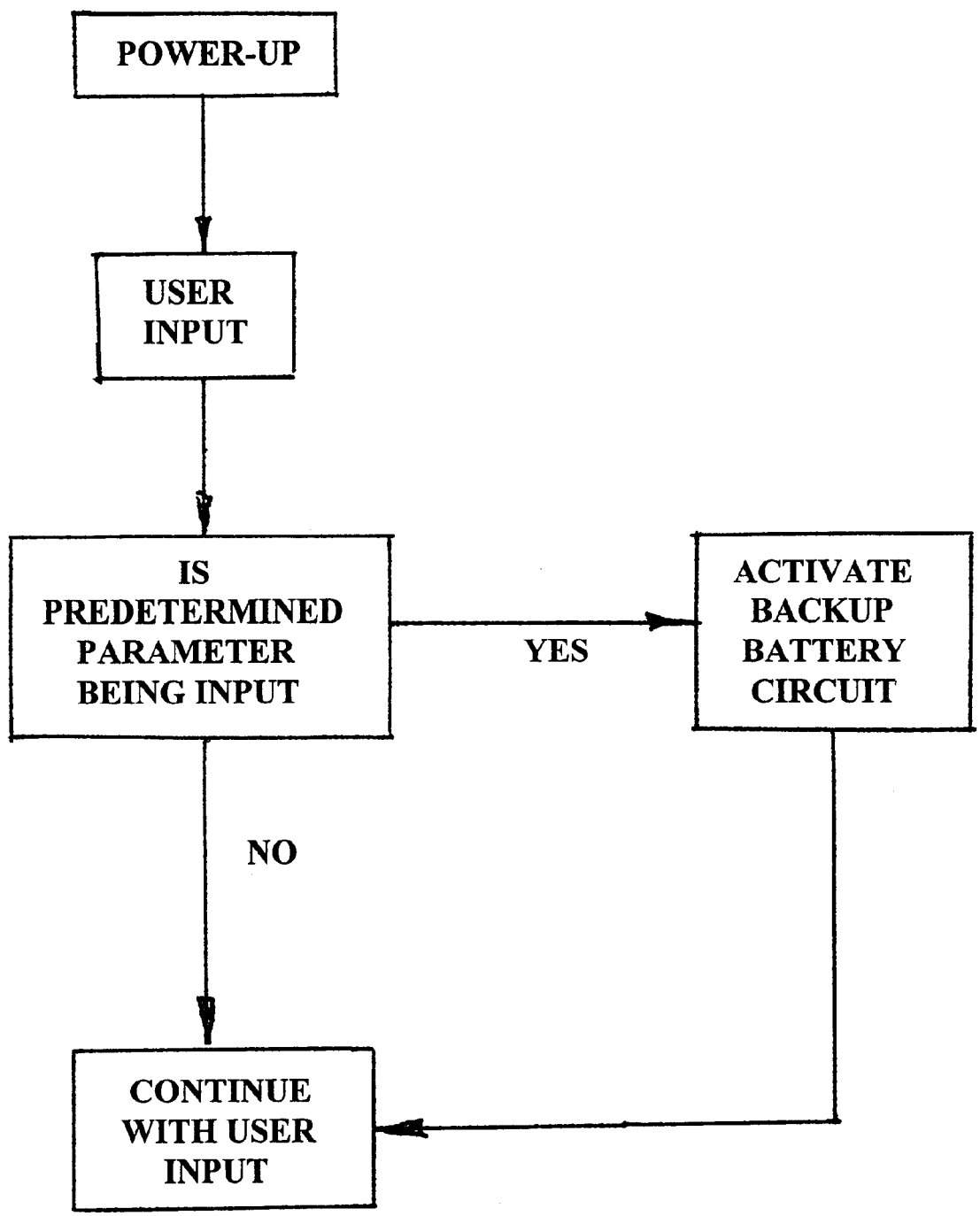
FIG. 2 is a flow diagram illustrating the operation of the present invention.

FIG. 2 is a flow diagram illustrating the operation of the present invention. The digital electronic device 10 first goes through a power-up sequence as a result of the user turning on the electronic device 10. The user would then begin to input information through the input port 24. central processing unit 20 determines whether the user is inputting the particular predetermined input parameter, inputting other parameters, or just using electronic device 10. If the user is inputting the predetermined input parameter, central processing unit 20 recognizes this and closes switch 18 in line 17 and activates the backup battery 16 circuit so as to supply power from backup battery 16 to continuous operating unit 12. If the user is not inputting the predetermined input parameter, central processing unit 20 recognizes this and allows operation of the electronic device 10 to continue without activating the backup battery 16 circuit.

While preferred embodiments of the present invention have been described and illustrated herein, it should be understood by those skilled in the art that my invention may be varied in both arrangement and detail. The present invention can be embodied in other electronic device designs and methods besides these preferred embodiments. Therefore, the protection afforded the invention should only be limited in accordance with the following claims.

What is claimed is:

1. An electronic device for performing certain operations, comprising:

a continuous operating unit, the continuous operating unit providing operations benefitting from a backup power source;

a backup battery for providing backup power to the continuous operating unit, the battery installed in the electronic device at the time of manufacture and connected to the continuous operating unit through a switch, the switch being in the open position at the time of manufacture of the electronic device;

an input device for allowing a user to input signals;

a central processing unit connected to the continuous operating unit for receiving the input signals from the input device, the central processing unit containing firmware for performing operations of the electronic device; the central processing unit closing the switch when a predetermined parameter is received from the input device; and a main power source connected to the central processing unit and the continuous operating unit for providing operating power to the central processing unit and the continuous operating unit.

2. The electronic device of claim 1 wherein the operations of the continuous operating unit includes a calendar.

3. The electronic device of claim 1 wherein the operations of the continuous operating unit includes a clock.

4. The electronic device of claim 1 wherein the backup battery is a battery selected from he group consisting of alkaline, mercury, lithium, nickel cadmium, metal hydride and lithium ion batteries.

5. The electronic device of claim 1 wherein the operations of the central processing unit includes an appointment scheduler.

6. The electronic device of claim 1 wherein the operations of the central processing unit includes a phone directory.

7. The electronic device of claim 1 wherein the operations of the central processing unit includes an address book.

8. The electronic device of claim 1 wherein the predetermined parameter is the date.

9. The electronic device of claim 1 wherein the predetermined parameter is the time.

10. The electronic device of claim 1 wherein the predetermined parameter is an appointment.

11. The electronic device of claim 1 wherein the predetermined parameter is an address.

12. The electronic device of claim 1 wherein the predetermined parameter is a phone number.

13. The electronic device of claim 1 wherein the main power source is AC power.

14. The electronic device of claim 1 wherein the main power source is DC power.

15. The electronic device of claim 1 wherein the main power source is a rechargeable battery.

16. A method of operating an electronic device, comprising:

executing an initialization procedure when an on/off control of a electronic device is actuated to an on condition;

obtaining input information via an input device;

analyzing the input information in a central processing unit to determine if a predetermined parameter is being input for the first time; and closing a circuit between a backup battery and a continuous operating unit via a signal from the central processing unit when the predetermined parameter is input for the first time.

17. The electronic device of claim 16 wherein the continuous operating unit includes a calendar.

18. The electronic device of claim 16 wherein the continuous operating unit includes a clock.

19. The electronic device of claim 16 wherein the backup battery is a battery selected from the group consisting of alkaline, mercury, lithium, nickel cadmium, metal hydride and lithium ion batteries.

20. The electronic device of claim 16 wherein the predetermined parameter is the date.

21. The electronic device of claim 16 wherein the predetermined parameter is the time.

22. The electronic device of claim 16 wherein the predetermined parameter is an appointment.

23. The electronic device of claim 16 wherein the predetermined parameter is an address.

24. The electronic device of claim 16 wherein the predetermined parameter is a phone number.

25. An electronic device, comprising:

a backup battery installed during manufacturing of the electronic device and capable of providing backup power to the electronic device through a closed switch, wherein the switch is in an open position when installed in the electronic device;

a central processing unit preprogrammed to automatically close the switch when a predetermined parameter is received by a predefined input signal; and a main power source connected to the central processing unit and for providing main operating power to the electronic device.

26. The electronic device of claim 25, further comprising a continuous operating unit connected to the switch for receiving power from the battery backup.

27. The electronic device of claim 25, wherein the input signal derives from a user and wherein the central processing unit closes the switch when the predefined input signal is received from the user for the first time.

* * * * *